(12) United States Patent
Morgan et al.

(10) Patent No.: US 9,906,415 B2
(45) Date of Patent: *Feb. 27, 2018

(54) TRANSACTIONAL ORCHESTRATION OF RESOURCE MANAGEMENT AND SYSTEM TOPOLOGY IN A CLOUD ENVIRONMENT

(71) Applicant: International Business Machines Corporation, Armonk, NY (US)

(72) Inventors: Edward T. Morgan, Issaquah, WA (US); Roger C. Raphael, San Jose, CA (US); Paul S. Taylor, Redwood City, CA (US); Michael G. Winter, Camarillo, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/151,671

(22) Filed: May 11, 2016

(65) Prior Publication Data
US 2016/0380913 A1 Dec. 29, 2016

Related U.S. Application Data

(63) Continuation of application No. 14/751,265, filed on Jun. 26, 2015.

(51) Int. Cl.
*H04L 29/08* (2006.01)
*H04L 12/24* (2006.01)
*H04L 12/911* (2013.01)

(52) U.S. Cl.
CPC ............ *H04L 41/12* (2013.01); *H04L 47/781* (2013.01); *H04L 67/10* (2013.01); *H04L 67/1097* (2013.01); *H04L 67/327* (2013.01)

(58) Field of Classification Search
None
See application file for complete search history.

(56) References Cited

U.S. PATENT DOCUMENTS

| 8,683,262 B1 * | 3/2014 | Subbiah .............. G06F 11/1471 714/16 |
| 2011/0138034 A1 | 6/2011 | Brookbanks et al. |

(Continued)

FOREIGN PATENT DOCUMENTS

| WO | WO2012/094760 A1 | 7/2012 |
| WO | WO2012/154860 A4 | 11/2012 |

(Continued)

OTHER PUBLICATIONS

List of IBM Patents or Patent Applications Treated as Related, May 11, 2016, 2 pages.

(Continued)

*Primary Examiner* — Philip Chea
*Assistant Examiner* — Hassan Khan
(74) *Attorney, Agent, or Firm* — Francis Lammes; Stephen J. Walder, Jr.; Robert C. Bunker

(57) ABSTRACT

Mechanisms are provided, in a cloud computing data processing system comprising a plurality of components, hosted on one or more hardware computing devices of the cloud computing data processing system, for transactional resource and topology management. A cloud service system is instantiated that comprises component instances having allocated resources. The cloud service system comprises orchestration engine logic which generates a transactional data structure that stores objects corresponding to transactions executed in association with resources and component instance state changes. The orchestration engine logic receives transactions associated with resources or component instances of the cloud service system and records the transactions as objects in the transactional data structure in (Continued)

response to receiving the transactions. In response to detecting an exception during operation of the cloud service system, a recovery engine utilizes the objects in the transactional data structure to restart or recover the cloud service system.

7 Claims, 4 Drawing Sheets

(56) References Cited

U.S. PATENT DOCUMENTS

| | | | | |
|---|---|---|---|---|
| 2012/0124211 A1* | 5/2012 | Kampas | ............. | G06F 9/50 709/226 |
| 2012/0179646 A1 | 7/2012 | Hinton et al. | | |
| 2012/0290547 A1* | 11/2012 | Kamimura | ......... | G06F 17/30368 707/703 |
| 2013/0110767 A1* | 5/2013 | Tatemura | .......... | G06F 17/30315 707/607 |
| 2013/0212068 A1 | 8/2013 | Talius et al. | | |
| 2013/0318060 A1 | 11/2013 | Chang et al. | | |
| 2014/0172954 A1 | 6/2014 | Salsburg et al. | | |
| 2014/0278808 A1* | 9/2014 | Iyoob | ................. | G06Q 30/0206 705/7.35 |
| 2014/0280375 A1* | 9/2014 | Rawson | ............ | G06F 17/30289 707/803 |
| 2014/0282536 A1* | 9/2014 | Dave | ................... | G06Q 30/0631 718/1 |
| 2015/0277966 A1* | 10/2015 | Sasaki | ..................... | G06F 9/466 707/703 |
| 2016/0019279 A1* | 1/2016 | Sengupta | .......... | G06F 17/30581 707/625 |
| 2016/0110403 A1* | 4/2016 | Lomet | ............... | G06F 17/30356 707/695 |
| 2016/0321296 A1* | 11/2016 | Kakivaya | ........... | G06F 17/30581 |

FOREIGN PATENT DOCUMENTS

| | | |
|---|---|---|
| WO | WO2012/174471 A1 | 12/2012 |
| WO | WO2012/174805 A1 | 12/2012 |

OTHER PUBLICATIONS

Levandoski, Justin J. et al., "Deuteronomy: Transaction Support for Cloud Data", 5th Biennial Conference on Innovative Data Systems Research (CIDR), Jan. 9-12, 2011, 11 pages.

Tan, Wei et al., "Diff-Index: Differentiated Index in Distributed Log-Structured Data Stores", EDBT: 17th International Conference on Extending Database Technology, Mar. 24-28, 2014, pp. 700-711.

* cited by examiner

TRANSACTIONAL ORCHESTRATION OF RESOURCE MANAGEMENT AND SYSTEM TOPOLOGY IN A CLOUD ENVIRONMENT

This application is a continuation of application Ser. No. 14/751,265, filed Jun. 26, 2015, status pending.

BACKGROUND

The present application relates generally to an improved data processing apparatus and method and more specifically to mechanisms for providing transactional orchestration of resource management and system topology in a cloud environment.

Cloud computing is a relatively recent technological offering that relies on sharing of resources to achieve coherence and economies of scale, similar to a utility (like the electricity grid), over a data network. At the foundation of cloud computing is the broader concept of converged infrastructure and shared services. Cloud computing, or more simply "the cloud", focuses on maximizing the effectiveness of the shared resources. Cloud resources are usually not only shared by multiple users but are also dynamically reallocated on-demand. For example, a cloud computer facility that serves European users during European business hours with a specific application (e.g., email) may reallocate the same resources to serve North American users during North America's business hours with a different application (e.g., a web server). This approach maximizes the use of computing power, thereby reducing environmental damage as well as requiring less power, air conditioning, rack space, etc., since the same resources are utilized for multiple purposes and for multiple users. In the same vein, with cloud computing, multiple users can access a single server or set of servers to retrieve and update their data without purchasing licenses for different applications.

Proponents claim that cloud computing allows companies to avoid upfront infrastructure costs, and focus on projects that differentiate their businesses instead of on infrastructure. Proponents also claim that cloud computing allows enterprises to get their applications up and running faster, with improved manageability and less maintenance, and enables information technology to more rapidly adjust resources to meet fluctuating and unpredictable business demand.

The present availability of high-capacity networks, low-cost computers and storage devices, as well as the widespread adoption of hardware virtualization, service-oriented architecture, and autonomic and utility computing have led to a growth in cloud computing. Companies can scale up as computing needs increase and then scale down again as demands decrease.

SUMMARY

In one illustrative embodiment, a method is provided, in a cloud computing data processing system comprising a plurality of components, hosted on one or more hardware computing devices of the cloud computing data processing system, for transactional resource and topology management. The method comprises instantiating, by the cloud computing data processing system, a cloud service system comprising one or more component instances. The one or more component instances have allocated resources. The cloud service system comprises orchestration engine logic. The method further comprises generating, by the orchestration engine logic, a transactional data structure corresponding to the cloud service system. The transactional data structure stores objects corresponding to transactions executed in association with resources and component instance state changes. The method also comprises receiving, by the orchestration engine logic, transactions associated with resources or component instances of the cloud service system. In addition, the method comprises recording, by the orchestration engine logic, the transactions as objects in the transactional data structure in response to receiving the transactions. Moreover, the method comprises, in response to detecting an exception during operation of the cloud service system, utilizing, by a recovery engine, the objects in the transactional data structure to restart or recover the cloud service system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
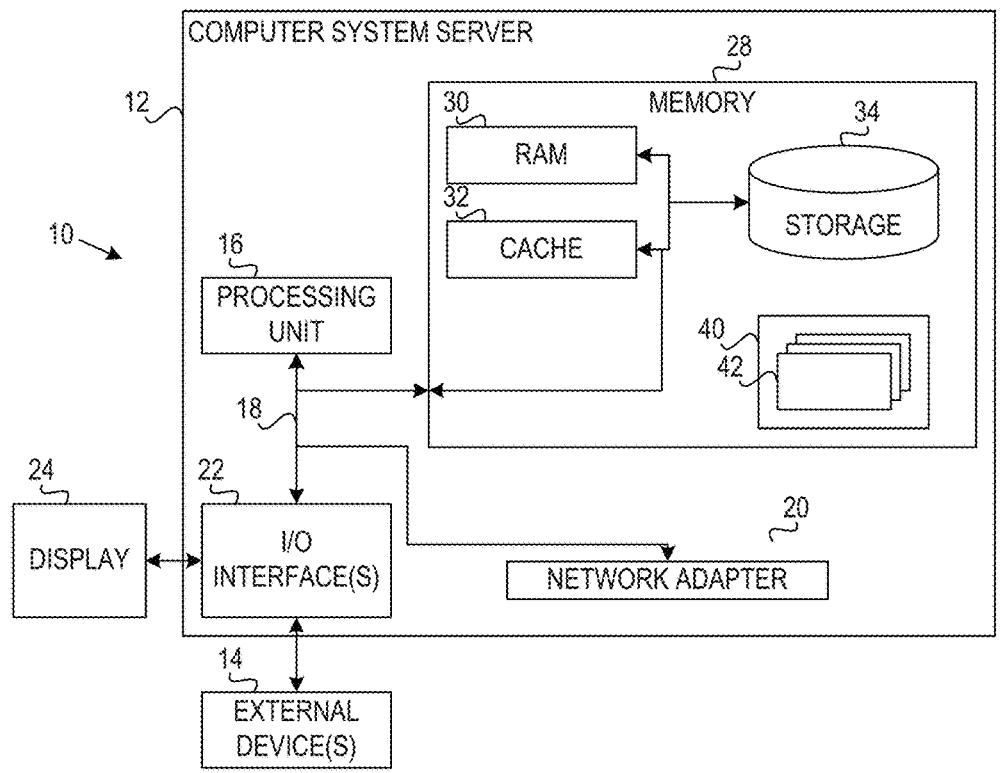
FIG. 1 depicts a cloud computing node according to an embodiment of the present invention.

The illustrative embodiments provide mechanisms for guaranteeing transactional orchestration of resource management and system topology in a cloud computing environment (referred to herein simply as "the cloud"). The use of a transactional based mechanism for resource and topology management alleviates issues associated with developing and implementing orchestration engine logic, which must orchestrate various resources across various platforms to provide the infrastructure for the cloud services that are provided. It should be appreciated that the term "topology" may refer to an application topology or a physical topology. With regard to an application or software topology, the term "topology" refers to configuration of the interconnections between instances of components of the application or software. With regard to a physical topology, the term "topology" refers to the physical computing devices utilized as part of the cloud computing environment, e.g., the data processing systems, storage systems, memories, storage devices, compute nodes, network connections, etc. Unless stated otherwise, with regard to the present description, the term "topology" is meant to refer to the application or software topology which comprises a collection of application or software components that together constitute a cloud service which is hosted by one or more physical computing devices. As such, the cloud computing environment may host one or more cloud services simultaneously.

The term "component" refers to a portion of an application or software product that performs a designated function of the overall application or software. That is, an application or software product is comprised of a plurality of components of the same or different types. Each component may be provided as instances of the component such that an application instance may itself be comprised of multiple instances of a particular component, e.g., an application instance may comprise 3 instances of a "receive transaction" component, 2 instances of an "authentication" component, and 1 instance of a "bank account linkage" component. The number of instances of components may be determined dynamically, such as in response to load on the application instance, and instances of components may be created dynamically in response. In general, component instances utilize resources of the cloud computing environment, e.g., compute resources, storage resources, and network resources. It should be appreciated that references to "components" within this description is a reference to component "instances" and thus, a component is an instance of the component and there may be multiple instances of the same component that together comprise a plurality of components.

The term "resource" refers to virtualized representations of physical computing devices which, by virtue of their virtualization, may be sub-allocated in portions to different cloud services, e.g., a resource may be a virtualization of a portion of memory, a portion of a storage device or plurality of storage devices, a virtualization of a portion of compute node utilization (e.g., CPU usage), or the like. For example, a physical 4-core CPU may be allocated as 4 separate 1-CPU virtual core resources. Resources generally fall into three different categories, i.e. compute resources, storage resources, and network resources. A compute resource may be a virtual machine, for example. A storage resource may be a virtual storage device or virtualized portion of memory, for example. A virtualized network resource may comprise a portion of shared bandwidth, a virtualized network adapter, or the like, for example. Components of an application or software product need such resources to execute (compute resource), persist data (storage resource), and communicate with other components of the same or different application or software product (network resources). Ultimately, it should be appreciated that the components, resources, and topology are hosted on one or more computing devices or data processing systems which, in the cloud generally involves hosting in a distributed manner with the application being a multi-component distributed application.

In a multi-component distributed application, such as a cloud service in which the infrastructure of the service is provided by conglomeration of one or more data processing systems and/or storage systems, autonomic orchestration of the resources/components is provided as part of a single instance of a cloud infrastructure service, i.e. each instance of an Infrastructure as a Service (IaaS) application of a cloud computing environment has an orchestration engine that orchestrates the allocation and management of resources of the cloud computing environment to the instances of components of the IaaS application. These resources may take many disparate forms including virtualized portions of compute nodes, e.g., processors, systems-on-a-chip (SOCs), data processing systems, etc., that execute various pieces, or component instances, of a distributed, multi-tiered application. These resources may also include virtualized storage devices, disk storage space, network load balancers, or any other resource that may be allocated dynamically for use by component instances in a cloud service. These resources may be physical or virtualized resources.

Each of the resources themselves may be used for a plurality of different purposes. For example, a disk storage resource may be used for database storage or for content storage, such as in the case of a content management system. Because the resources may be used for different purposes, the orchestration engine logic of a cloud service must be aware of the purpose of each resource and how the resources are interconnected.

The differing nature of the resources, the different purposes for which these resources may be utilized in a cloud service (assumed hereafter to be an IaaS could service for simplicity), and the dynamic nature of the IaaS resource to component instance allocation, implies the need to track atomic, consistency, isolation, and durability (ACID) properties for all interactions with the cloud service, e.g., the IaaS application, which utilizes multiple resources, e.g., virtualized storage, compute nodes, load balancers, soft sub nets (sdn), etc., as well as state changes in the IaaS application component topology simultaneously. In addition, these factors indicate the need to permit full recovery to a point of complete consistency of the entire/overall IaaS application including all of its components and resources, thereby providing a complete and functional IaaS application upon recovery. The IaaS should be able to recover entirely to consistency at a completely different location within the cloud computing environment, e.g., in a completely different set of computing devices or data processing systems that are part of the cloud computing environment, in the case of a complete disaster recovery scenario or in special cases of system cloning.

One solution is to utilize explicit in-memory tracking of acquired resources and topology transitions using volatile data structures, or "transients." In such a case, however, the core orchestration engine logic of the IaaS application is responsible for providing the logic to perform any recovery operations should a failure occur. This severely complicates the orchestration engine logic since it is a complex operation to handle exceptions in the orchestration flow to release multiple resources, of various types, and revert the cloud computing environment topology state transitions in a formal manner. Moreover, if the orchestration engine logic, or the platform on which the orchestration engine logic is executing, should experience a failure or "crash", then the in-memory state information maintained by the orchestration engine logic will be lost, thereby eliminating any ability to recover the IaaS application.

The mechanisms of the illustrative embodiments provide a write-ahead-log (WAL) data structure in an object store, i.e. a stable storage, which is independent of the orchestration engine of the instance(s) of a cloud computing environment infrastructure service. Records in the WAL data structure are separate, specially named objects in the object store. The WAL record objects capture both the resource and cloud computing environment topology transitions in a temporal domain. This is achieved by creating sequential WAL record objects in non-volatile storage, e.g., the object store, a database, or the like, in a structured manner which is globally visible by the underlying cloud computing environment infrastructure. That is, the contents of the WAL record objects are immutable once written and are visible across all cloud resource locations.

The WAL record objects provide a separate independent store of transaction-type resource and topology transitions which support both transactional recovery and crash recovery. With regard to transactional recovery, if at any point while the orchestration engine logic is operating (which the orchestration engine logic may have obtained multiple resources, experienced multiple state transitions, and the like), the mechanisms of the illustrative embodiments may utilize the WAL record objects to roll-back or commit the changes associated with the WAL record objects to effect a complete and full release of resources/components and reversion of system state to prior to the point the transaction was started. This relieves the orchestration logic from dealing with the recovery of the transaction on exception handling and eliminates the need for explicit logic based mechanisms for performing a specific transaction recovery. All that is required is that the WAL record object resource/component and topology state changes be committed or rolled-back based on their temporal characteristic relative to the transaction for which the exception was generated.

With regard to crash recovery, if a crash occurs in the orchestration engine logic, then a new copy of the orchestration engine logic may be instantiated that will re-create the state of the crashed orchestration engine logic utilizing the resource/component and topology state change information maintained in the WAL record objects. The WAL records stored in the WAL record objects may be read back in chronological order and thereby, the copy of the orchestration engine logic is informed of the state of the IaaS application as of the moment of the crash. These mechanisms prevent leaks of resources and accelerate recovery when compared to mechanisms for enumerating the allocated resources and trying to determine the purpose of each through interrogating the instance of the IaaS application.

The illustrative embodiments may include a layer/library or proxy service that works in conjunction with the cloud computing environment mechanisms, e.g., agents or Dynamic Resource Management (DRM) instances, to export interfaces to the instances of the orchestration engine logic for performing operations which in turn cause WAL record objects to be generated for various resource/component and topology state changes communicated by the agents/DRM instances, which are associated with each resource and drive transactions. For example, interfaces may be exported to each instance of orchestration engine logic for various IaaS application components for beginning a transaction, committing a transaction, rolling-back a transaction, recovering the IaaS application instance and resources/components (collectively referred to herein as the "IaaS system"), acquiring a resource, setting an initial state of a topology component, and transitioning a state of a topology component.

The orchestration engine logic itself has capabilities implemented in it for application specific plugged-in code for each state transition directed pair of a state machine so that the recovery mechanism for either transactional recovery or failure/crash recovery can invoke the correct code blocks of the orchestration engine to revert both resource and IaaS system topology states appropriately. For example, there is a code block for state transition S1 to S2 and from S2 to S1 with arguments of each being generalized in the form of an opaque payload with a constant header that the orchestration engine logic code block is configured to unpack and process to perform the corresponding state transition.

Thus, the mechanisms of the illustrative embodiments utilize transaction encapsulation that is tied to the higher level orchestration engine of a cloud service. That is, the transaction encapsulation provided via the transactional write-ahead-log (WAL) maintains transactional consistency at a system layer, e.g., at a datacenter, ecosystem, etc. layer, allowing for recovery or restart of the IaaS system, i.e. the cloud service along with its corresponding resources and topology components. The transaction encapsulation is implemented in such a way that under extraneous failures and conditions, the cloud computing environment operates so as to not leak away cloud service resources, which have a significant cost to the cloud service provider. Moreover, the transaction encapsulation is implemented in such a way that inconsistent cloud computing environment topology that does not conform to the cloud service application's orchestration engine specification is avoided.

Before beginning the discussion of the various aspects of the illustrative embodiments in greater detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
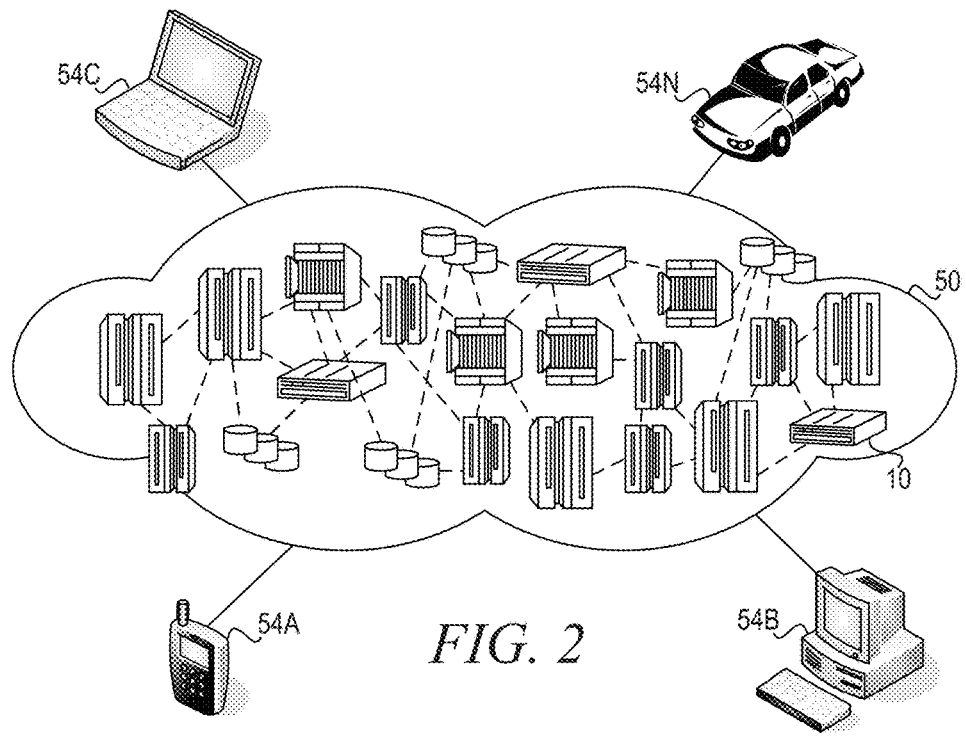
FIG. 2 depicts a cloud computing environment according to an embodiment of the present invention.
Figure 3:
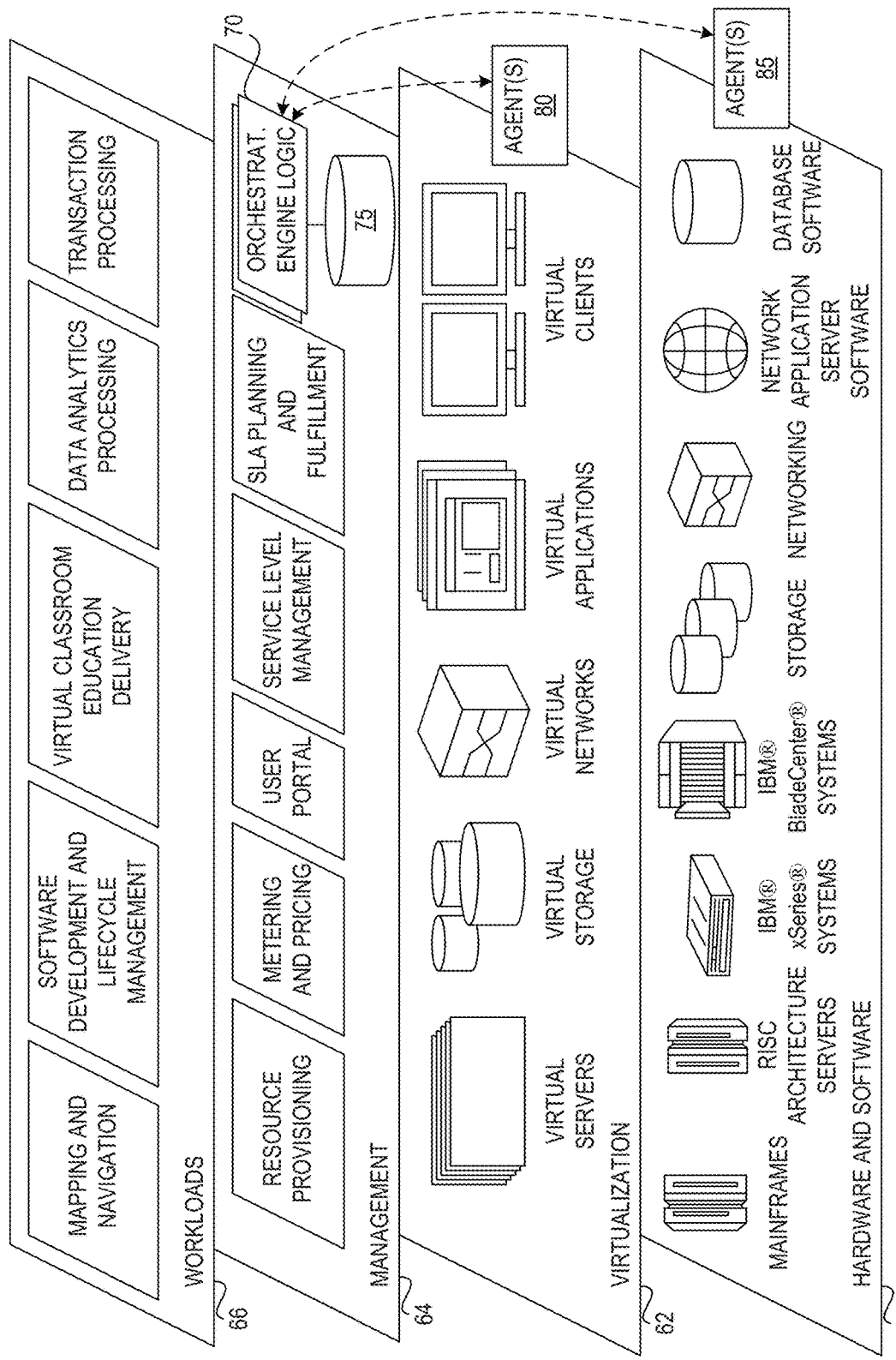
FIG. 3 depicts abstraction model layers according to an embodiment of the present invention.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

It should be understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Referring again to the management layer 64, in accordance with the mechanisms of the illustrative embodiments, orchestration engine logic 70 may be provided for one or more cloud services offered by the cloud computing environment 50, as part of this management layer 64. The orchestration engine logic 70 may be instantiated for each instance of a cloud service so as to orchestrate allocation and management of resources and topology components to the particular cloud service instance, e.g., an instance of an IaaS application. The orchestration engine logic 70 may operate in conjunction with agents 80, 85 at the virtualization layer 62 and hardware and software layer 60 which may provide transactions via exported interfaces to the orchestration engine logic 70 for recording in records of the write-ahead-log (WAL) in the object store 75.

The transactions performed via agents 80, 85 and the orchestration engine logic 70 are atomic and transactional. Various types of transactions may be performed via the agents 80, 85 and the orchestration engine logic for managing the resources and topology of the cloud computing environment 50 allocated to the cloud service associated with these agents 80, 85 and orchestration engine logic 70. For example, transactions may be associated with operations for allocation/de-allocation of resources, state changes of resources/components, and roll-back/recovery operations.

It should be appreciated that in the conceptual diagram of FIG. 3, the object store 75 is shown as linked to the orchestration engine logic 70 but in implementation these are preferably not hosted on the same virtual and/or physical resources so as to avoid loss of the WAL records should a failure/crash of the orchestration engine logic 70 occur. Moreover, the object store is preferably a stable non-volatile storage, such as a non-volatile RAM (NVRAM), Flash memory storage, or the like. In some illustrative embodiments, the object store 75 may be configured as a database of objects and may be managed using a database management system outside of the cloud service system itself. The orchestration engine logic 70 may utilize the WAL records in the object store 75 in the event of a failure or crash, or any other need to restore the state of resources/components of a corresponding cloud service as described hereafter.

Figure 4:
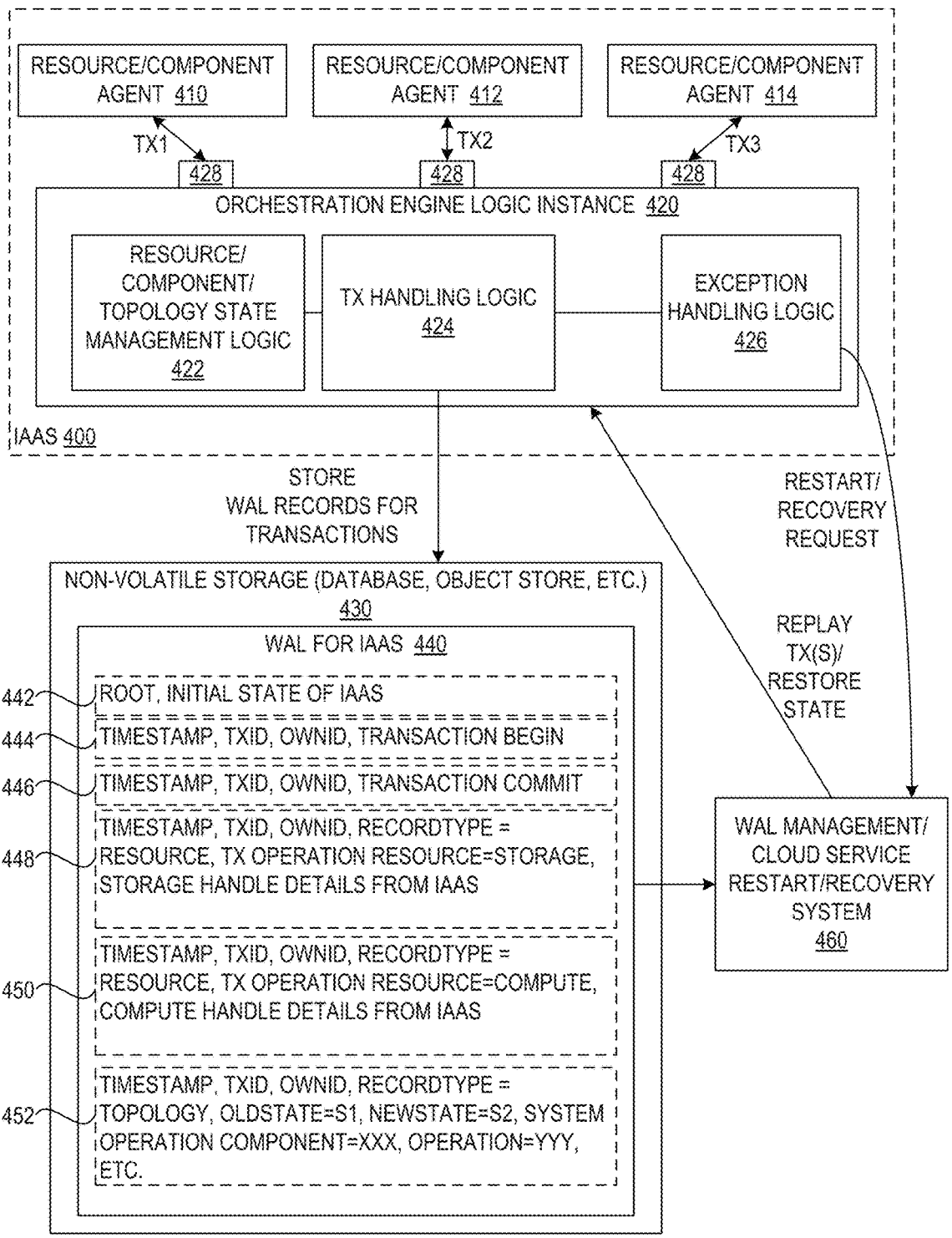
FIG. 4 is an example block diagram illustrating the interaction between the primary operational components of the illustrative embodiments with regard to a single cloud service.

FIG. 4 is an example block diagram illustrating the interaction between the primary operational components of the illustrative embodiments with regard to a single cloud service. As shown in FIG. 4, the primary operational elements comprise a cloud service system 400, which in this case is considered to be an infrastructure as a service (IAAS) cloud service system 400. The cloud service system 400 comprises an orchestration engine logic instance 420 which is an instance of the orchestration engine logic for the particular IAAS cloud service system 400. It should be appreciated that there may be many cloud service systems provided by the same cloud service environment, operating on the same or different data processing systems or computing devices, but with different allocations of resources and different component instances. Thus, there may be multiple instances of the same or different orchestration engine logic for these various cloud service systems.

The orchestration engine logic instance 420 operates in conjunction with resource/component agents 410-414 associated with the various resources and components of the cloud service system (not shown). The agents 410-414 operate using exported interfaces to communicate changes in allocation and state of the resources/components to/from the orchestration logic instance 420 in the form of transactions, e.g., transactions TX1, TX2, and TX3. The transactions are processed via the transaction handling logic 424 and appropriate corresponding operations for managing the resources and topology components associated with the agents 410-414 are performed. These operations may be performed by resource/component/topology state management logic 422, for example.

The orchestration engine logic instance 420 is depicted as having associated exception handling logic 426 which handles exceptions encountered by the orchestration engine logic instance 420 either due to operations being performed by the orchestration engine logic instance 420 or reported to the orchestration engine logic instance 420 by resources/components via the agents 410-414. It should be appreciated that while the exception handling logic 426 is shown as part of the orchestration engine logic instance 420, the illustrative embodiments are not limited to such. Rather, the exception handling logic 426 may be provided as a separate element of the cloud service system 400 or as a separate entity from the cloud service system 400, such as part of a higher level management system for the entire cloud computing environment, for example. By removing the exception handling logic 426 from the orchestration engine logic instance 420, the configuration and development of the orchestration engine logic may be made less complex.

The transaction (TX) handling logic 424, in addition to performing operations to implement the actions associated with the transactions, stores write-ahead-log (WAL) records 442-452 for each of the transactions in a WAL 440 for the cloud service system 400, in accordance with the illustrative embodiments. These WAL records 442-452 store temporal characteristics of the transactions, e.g., timestamps, along with information for tracking the state of resources and topology components associated with the cloud service system 400. In some illustrative embodiments, these WAL records 442-452 may be stored as separate distinctly named objects in an object storage (represented by the dashed lined boxes). In other illustrative embodiments, a database storage may be utilized where entries in the database represent the different transactions and are managed by a database management system, such as may be provided as part of a WAL management/cloud service restart/recovery system 460, for example.

In addition, the exception handling logic 426, either part of the orchestration engine logic instance 420, the cloud service system 400, or as a separate entity, may send requests for a restart/recovery of the cloud service system 400 to a WAL management and cloud service restart/recovery system 460. The WAL management and cloud service restart/recovery system 460 comprises logic for managing the WALs 440 for the various cloud service systems 400 as well as the various objects/entries in the WALs 440. The WAL management and cloud service restart/recovery system 460 provides logic for accessing the objects/entries and for performing operations to restart/recover the cloud service system 400 in the event of a restart/recovery request being received. In the case of a restart/recovery request being received, indicating the cloud service system 400 to be restarted/recovered and the timestamp of the exception that is the cause of the restart/recovery request, the WAL management and cloud service restart/recovery system 460 reads the WAL records 442-452 of the WAL 440 for the indicated cloud service system 400 and replays or re-executes the transactions that occurred prior to the timestamp of the exception. In this way, the resources/topology components of the current instance of the cloud storage system 400, or a new instance of the cloud storage system 400, is brought back to a consistent state as just prior to the failure or event causing the requirement to restart/recover the cloud service system 400. This restart/recovery is performed both with regard to the resources and with regard to the state of the components of the topology associated with the cloud storage system 400. The transactions may include transactions for allocation of resources, de-allocation of resources, state changes in components of the topology, and the like, roll-back operations, commit operations, and the like.

Thus, as mentioned above, the illustrative embodiments provide mechanisms for guaranteeing transactional orchestration of resource management and system topology in a cloud service system of a cloud computing environment. The use of a transactional based mechanism for resource and topology management alleviates issues associated with developing and implementing orchestration engine logic, which must orchestrate various resources across various platforms to provide the infrastructure for the cloud services that are provided.

As shown in FIG. 4, the WAL data structure 440 for the cloud service system 400 is provided in a stable storage, such as a NVRAM, Flash storage, or other known or later developed stable storage, which is independent of the orchestration engine logic instances 420 of the cloud computing environment. WAL records 442-452 in the WAL data structure 440 are separate, specially named objects 442-452 in the object store or database. As noted above, the WAL record objects 442-452 capture both the resource and cloud computing environment topology transitions in a temporal domain. This is achieved by creating sequential WAL record objects 442-452 in non-volatile storage in a structured manner which is globally visible by the underlying cloud computing environment infrastructure and the various cloud service systems 400. That is, the contents of the WAL record objects 442-452 are immutable once written and are visible across all cloud resource/component locations and cloud service systems 400.

As shown in FIG. 4, various information may be stored in the WAL record objects 442-452 depending upon the particular transactions being represented by the corresponding WAL record object 442-452. Examples of the contents of some of these WAL record objects 442-452 are shown in FIG. 4 for illustration purposes. In general, a WAL 440 for a cloud service system 400 will begin with a root WAL object 442 that stores the initial state information for the cloud service system 400, e.g., the initial state of the resources/topology components that together make up the cloud service system 400 at an initial time point.

The other WAL objects 444-452 have common components of a timestamp, a transaction identifier (TXID), an owner identifier (OWNID), and a record type. The timestamp corresponds to a time at which the transaction was performed and is used for purposes of ordering the WAL objects 444-452 in a chronology order for playback or replay purposes.

The transaction identifier (TXID) is a unique identifier of the transaction with which the WAL object 444-452 corresponds. The transaction identifier (TXID) may be generated in a monotonic manner using the underlying object store/database name space for atomicity of the naming convention in such a way that the monotonical sequence may be derived at a later stage for both transaction and crash recovery and cloud service system 400 restart. The transaction identifier (TXID) is defined/established when the transaction BEGINs. The TXID is then applied to state transitions across 1-N resources/components at which point the transaction is COMMITed and the aggregate state of the system (based on all of the resource transitions) is finalized and the new overall cloud service system state is established. For example, a transaction may go through the following states TRANSACTION BEGIN (TXID 123), resource change (TXID 123), resource change (TXID 123), TRANSACTION COMMIT (TXID 123).

The owner identifiers (OWNIDs) are identifiers of the agents/orchestration engine logic instance that submitted the transaction. The owner identifiers are assumed to be unique by way of distributed consensus methods. That is, the agents 410-414 may coordinate with one another to select unique identifiers for themselves.

The record type indicates the type of WAL record that the WAL object 444-452 represents, e.g., a resource state change, a topology component state change, or the like. The record type indicates the format by which the remainder of the information in the WAL object 444-452 is provided so that when the WAL object 444-452 is read, the information may be interpreted correctly for purposes of replay/reprocessing of the transactions corresponding to the WAL objects 444-452.

In addition to these common components of the WAL objects 444-452, the WAL objects 444-452 have information corresponding to the particular type of transaction that stores data representing the allocation/de-allocation and state changes of the resources and topology components. For example, WAL objects 448-450 store a transaction operation resource identifier indicating the type of resources for which the WAL object 448-450 provides information about the state change. In addition, corresponding details of the changes to the state of the resources is stored in fields of the WAL objects 448-450 as obtained from the cloud service system 400. For example, storage handle details and compute handle details may be provided which include information about the virtualized resources being used, e.g., compute node identifier, storage volume identifier, etc. In the case of a compute node, for example, state settings/transitions may be "stopped", "starting", "started", etc.

WAL object 452 corresponds to a state change affecting the components of the cloud service system 400. Thus, the record type in this case is a "topology" type and the additional information about the transaction includes the old state, the new state, the component that the state change affects, and the operation performed, among other possible information. Thus, changes to the topology state include indications of the component affected and the operation performed as well as the state change (previous and new state). The changes to state of the resources associated with the cloud service system 400 include an identifier of the resource and details of the change in the state of the resource.

The transactions handled by the transaction handling logic 24 of the orchestration engine logic instance 420, and the corresponding state change operations performed by the resource/component/topology state management logic 422, result in corresponding WAL objects 442-452 being written to the WAL 440 for the cloud service system 400 in an immutable manner. As can be seen from FIG. 4, the WAL record objects 442-452 provide a separate independent store of transaction-type resource and topology transitions which support both transactional recovery and crash recovery.

With regard to transactional recovery, if at any point while the orchestration engine logic instance 420 is operating, an exception condition occurs, such as an error in a resource, a crash of the cloud service system 400, or the like, the exception is recognized and handled by the exception handling logic 426 including the sending of a request to restart/recover the cloud service system 400 to the WAL management/cloud service restart/recovery system 460. In response, the WAL management and cloud service restart/recovery system 460 reads the WAL objects 442-452 corresponding to the cloud service system 400 indicated in the restart/recovery request from the exception handling logic 426 and utilizes the WAL objects 442-452 to replay and roll-back or commit the changes associated with the WAL objects 442-452 to effect a complete and full release of resources/components and reversion of cloud service system 400 state to prior to the point the failure or event causing the exception occurred. This relieves the orchestration engine logic instance 420 from dealing with the recovery of the cloud service system 400 on exception handling and eliminates the need for explicit logic based mechanisms for performing transaction recovery. All that is required is that the WAL object 442-452 resource/component and topology state changes be committed or rolled-back based on their temporal characteristic relative to the failure or event for which the exception was generated.

With regard to crash recovery, if a crash occurs in the orchestration engine logic instance 420, then a new copy of the orchestration engine logic 420 may be instantiated that will re-create the state of the crashed orchestration engine logic instances 420 utilizing the resource/component and topology state change information maintained in the WAL objects 442-452. The WAL records stored in the WAL objects 442-452 may be read back in chronological order and thereby, the copy of the orchestration engine logic instance 420 is informed of the state of the cloud service system 400 as of the moment of the crash.

The illustrative embodiments may include a layer/library or proxy service (not shown) that works in conjunction with the cloud computing environment mechanisms, e.g., agents or Dynamic Resource Management (DRM) instances, to export interfaces 428 to the instances of the orchestration engine logic 420 for performing operations which in turn cause WAL objects 442-452 to be generated for various resource/component and topology state changes communicated by the agents/DRM instances, which are associated with each resource and drive transactions. For example, interfaces may be exported to each instance of orchestration engine logic 420 for various cloud service systems 400 for beginning a transaction, committing a transaction, rolling-back a transaction, recovering the cloud service system 400, acquiring a resource, setting a state of a topology component, and transitioning a state.

For example, in one illustrative embodiment, the layer/library or proxy service may export to the orchestration engine logic instance 420, the following interfaces 428:

1. Integer BeginOrchestrationTransaction(integer clientid);
2. Boolean CommitOrchestrationTransaction(txid);
3. Boolean RollbackTransaction(txid);
4. Boolean RecoverSystem(integer clientid);
5. Boolean AcquireResource(Object ResourceDescriptor);
6. Boolean SetState(Object state); and
7. Boolean TransitionState(Object newState).

The orchestration engine logic instance 420 itself has logic providing capabilities for application specific plugged-in code for each state transition directed pair of a state machine so that the recovery mechanism for either transactional recovery or failure/crash recovery can invoke the correct code blocks of the orchestration engine to revert both resource and system topology states appropriately, e.g., logic provided in resource/component/topology state management logic 422.

Thus, the illustrative embodiments provide mechanisms for ensuring transactional orchestration of resource management and system topology changes in cloud computing environments. The illustrative embodiments utilize an object store that is separate from the cloud service system that ensures that the transaction information for resource/topology component state changes is accessible in the event of a failure, crash, or other event requiring a restart/recovery of the cloud service system. Restart/recovery of the cloud service system is achieved by replaying or re-processing the transactions logged in the object store for the particular cloud service system.

Figure 5:
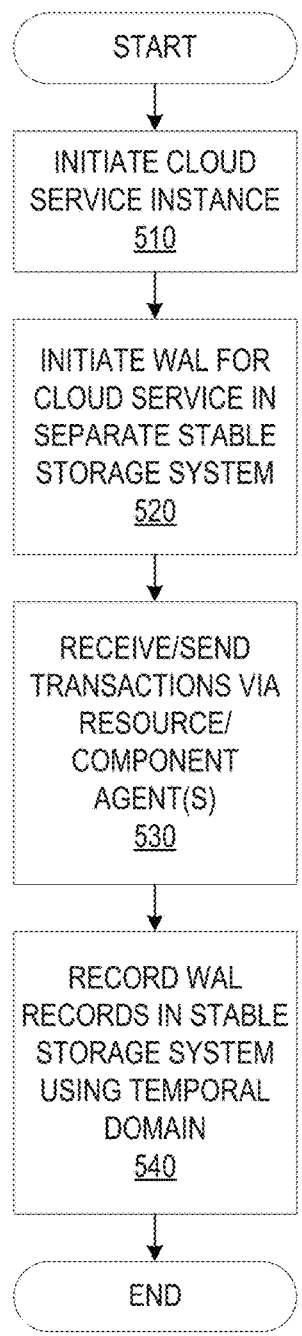
FIG. 5 is a flowchart outlining an example operation for storing a write-ahead-log (WAL) record in a WAL object of an object store in accordance with one illustrative embodiment.

FIG. 5 is a flowchart outlining an example operation for storing a write-ahead-log (WAL) record in a WAL object of an object store in accordance with one illustrative embodiment. As shown in FIG. 5, the operation starts with the initiation of a cloud service system instance, e.g., cloud service logic, orchestration engine logic instance, resources, topology components, agents, etc. (step 510). The write-ahead-log (WAL) for the cloud service system is generated in a separate stable storage system and a root object is stored in the WAL indicating the initial state of the cloud service system (step 520). Transactions are received via the resource component agent(s) as well as possibly the orchestration engine logic instance itself (step 530). The operations corresponding to the transactions are performed and the transactions are recorded as WAL records in WAL objects in the WAL for the cloud service system stored in the stable storage system, utilizing a temporal domain characteristic that can be used at a later time to serialize the WAL records for replay or re-processing to restart or restore the state of the resources/components of the cloud service system (step 540). The operation then terminates. It should be appreciated that while FIG. 5 shows the process terminating, the process may continue while transactions are being performed with regard to the cloud service system with the operation terminating once the cloud service system is terminated or upon occurrence of an event where the cloud service system is restarted, at which point the process may be repeated starting with step 510.

Figure 6:
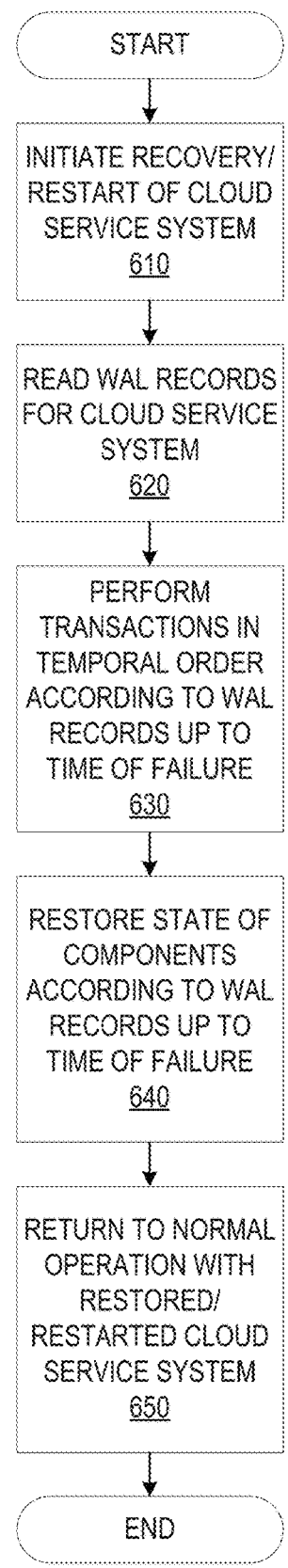
FIG. 6 is a flowchart outlining an example operation for restarting/recovering a state of a cloud service system in accordance with one illustrative embodiment.

FIG. 6 is a flowchart outlining an example operation for restarting/recovering a state of a cloud service system in accordance with one illustrative embodiment. As shown in FIG. 6, the operation starts with the initiating of a recovery/restart of the cloud service system (step 610). This may occur, for example, in response to a failure, crash, or event that causes an exception to be generated with the exception handling logic issuing a request for the recovery/restart. The request for recovery/restart may specify the particular cloud service system to recover/restart and the timestamp of the exception, or the event itself, indicating a temporal characteristic by which to identify which WAL records to replay/re-process for the particular cloud service system.

The WAL records, stored in the WAL objects of the WAL data structure in the stable storage, for the cloud service system are read (step 620) and the transactions corresponding to the WAL records are performed in temporal order according up to a time point corresponding to the failure, crash, or event indicated in the exception and the resulting request (step 630). The state of the components of the topology is restored according to the WAL records up to the time point of the failure, crash, or event (step 640). The operation the returns control the cloud service system for normal operation with the restored/restarted cloud service system (step 650). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a cloud computing data processing system comprising a plurality of components, hosted on one or more hardware computing devices of the cloud computing data processing system, for transactional resource and topology management, the method comprising:

instantiating, by the cloud computing data processing system, a cloud service system comprising one or more component instances, wherein the one or more component instances have allocated resources, wherein the cloud service system comprises orchestration engine logic;

generating, by the orchestration engine logic, a transactional data structure corresponding to the cloud service system, wherein the transactional data structure stores objects corresponding to transactions executed in association with resource instance state changes and component instance state changes, wherein the transactional data structure is a write-ahead-log (WAL) data structure stored in a non-volatile storage that is accessible by a plurality of the one or more hardware computing devices, wherein the objects are WAL objects comprising captured state change information describing component transitions, resource transitions, and topology transitions in a temporal domain, wherein the WAL objects are stored in the WAL data structure in a sequential manner, and wherein utilizing the objects in the transactional data structure to restart or recover the cloud service system comprises traversing the WAL objects of the WAL data structure in a sequential manner to recreate state transitions in accordance with temporal information of the WAL objects and a temporal characteristic of exception, and wherein each topology transition in the topology transitions are at least one of an application topology transition or a physical topology transition such that the application topology transition identifies a change in configuration of the interconnections between instances of components and the physical topology transition identifies a change in configuration of interconnections between instances of resources;

receiving, by the orchestration engine logic, transactions associated with resources or component instances of the cloud service system, wherein each transaction in the transactions comprises the state change information of the associated resource instance, component instance, and topology;

recording, by the orchestration engine logic, the transactions as objects in the transactional data structure in response to receiving the transactions; and in response to detecting an exception during operation of the cloud service system, utilizing, by a recovery engine, the objects in the transactional data structure to restart or recover the cloud service system to a consistent state just prior to the exception causing the restart or recover based the state change information of the associated resource instance, component instance, and topology.

2. The method of claim 1, wherein the cloud service system is an Infrastructure-as-a-Service (IaaS) cloud service system.

3. The method of claim 1, wherein the allocated resources are virtualizations of hardware resources of the one or more hardware computing devices.

4. The method of claim 1, wherein utilizing the objects in the transactional data structure to restart or recover the cloud service system comprises instantiating a new copy of the orchestration engine logic and re-creating a state of the orchestration engine logic in the new copy of the orchestration engine logic based on resource, component, and topology state change information maintained in the WAL objects of the WAL data structure.

5. The method of claim 1, wherein WAL objects in the WAL data structure store a timestamp of a state transition corresponding to the WAL object, a transaction identifier of a transaction associated with the state transition, an owner identifier indicating a source of the state transition information, and state transition detail information indicating a resource allocation/deallocation or state transition of a resource or topology component.

6. The method of claim 1, wherein receiving, by the orchestration engine logic, transactions associated with resource instances or component instances of the cloud service system comprises receiving the transactions from agents associated with one or more resources or components of the cloud service system via one or more exported interfaces.

7. The method of claim 1, wherein the recovery engine is separate and distinct from the orchestration engine logic.

* * * * *